United States Patent [19]
England et al.

[11] Patent Number: 6,076,007
[45] Date of Patent: Jun. 13, 2000

[54] SURGICAL DEVICES AND THEIR LOCATION

[75] Inventors: Mark England, Milton; Andrew Nicholas Dames, Cambridge; Michael David Crossfield, West Wickham, all of United Kingdom

[73] Assignee: Flying Null Limited, Harston, United Kingdom

[21] Appl. No.: 08/937,563

[22] Filed: Sep. 25, 1997

[30] Foreign Application Priority Data

Aug. 19, 1997 [GB] United Kingdom ............ 9717574

[51] Int. Cl.[7] .................................................. A61B 5/05
[52] U.S. Cl. ..................................... 600/424; 128/899
[58] Field of Search .................. 600/424, 410; 324/307, 309, 318; 128/899

[56] References Cited

U.S. PATENT DOCUMENTS

| | | | |
|---|---|---|---|
| 4,069,476 | 1/1978 | Narvatil | 365/6 |
| 4,173,228 | 11/1979 | Van Steenwyk et al. | 128/653 |
| 4,197,855 | 4/1980 | Lewin | 128/653 |
| 5,320,100 | 6/1994 | Herweck et al. | 128/654 |
| 5,353,795 | 10/1994 | Souza et al. | 128/653.2 |
| 5,425,367 | 6/1995 | Shapiro et al. | 128/653.1 |
| 5,456,718 | 10/1995 | Szymaitis | 623/11 |
| 5,457,382 | 10/1995 | Stein | |
| 5,558,091 | 9/1996 | Acker et al. | 128/653.1 |
| 5,622,169 | 4/1997 | Golden et al. | 128/653.1 |
| 5,729,129 | 3/1998 | Acker | 324/207.12 |
| 5,762,064 | 6/1998 | Polvani | 600/424 |
| 5,879,297 | 3/1999 | Haynor et al. | 600/407 |

FOREIGN PATENT DOCUMENTS

| | | | |
|---|---|---|---|
| 0320623 | of 0000 | European Pat. Off. | A61B 5/06 |
| 0754954 | of 0000 | European Pat. Off. | G01R 33/28 |
| 0713195 | 11/1994 | European Pat. Off. | |
| 9631790 | of 0000 | WIPO | G01V 15/00 |

*Primary Examiner*—Brian L. Casler
*Attorney, Agent, or Firm*—Oppenheimer Wolff & Donnelly LLP

[57] ABSTRACT

A surgical device, e.g. a catheter or a prosthesis, is disclosed which is characterised in that it carries, at a predetermined location, a tag formed of a high permeability, low coercivity magnetic material. Also disclosed is a method of locating a surgical device within the human or animal body, which comprises inserting the device into the body together with a magnetically active marker, the marker being associated with a predetermined location on the surgical device; and sensing the position of the marker, and hence of the surgical device, by remotely detecting its magnetic response to an interrogating signal. Systems for use in this method are also disclosed.

15 Claims, 3 Drawing Sheets

SURGICAL DEVICES AND THEIR LOCATION

This invention relates to the location of surgical devices within the human or animal body and, more particularly, is concerned with such systems using magnetic principles.

The invention is of particular benefit as applied to catheter location, but is not limited to this field of application; it may also, for example, find application in the locating of prostheses, needles, ports and other surgical devices which may deliberately or accidentally enter the human or animal body.

The magnetic principles used in this invention are those suitable for remote detection of a small magnetic marker. A preferred detection system is that based on Flying Null technology; this technology is described, for example, in our PCT Patent Publication No. WO 96/31790.

According to one aspect of the present invention, there is provided a method of locating a surgical device within the human or animal body, which comprises inserting the device into the body together with a magnetically active marker, the marker being associated with a predetermined location on the surgical device; and sensing the position of the marker, and hence of the surgical device, by remotely detecting its magnetic response to an interrogating signal.

As indicated above, this method is very useful when the surgical device in question is a catheter. In such a case, the marker is advantageously located close to the tip of the catheter (i.e. that end of the catheter which first enters the body). The marker may be provided on a surface of the catheter itself, or it may be provided on a guide wire used during insertion of the catheter.

The nature of the marker will be selected according to the specific circumstances of its intended use; it will, however, generally be formed from a high permeability, low coercivity magnetic material. Typically, the marker will be in the form of a thin film, a wire or a strip.

According to a second aspect of the present invention, there is provided a surgical device, e.g. a catheter or a prosthesis, which is characterised in that it carries, at a predetermined location, a tag formed of a high permeability, low coercivity magnetic material. The tag can be very small and therefore does not interfere with the operation of the surgical device.

According to a third aspect of the present invention, there is provided a system for use in determining the location of a surgical device within the human or animal body, which system comprises a surgical device which carries, at a predetermined location, a tag formed of a high permeability, low coercivity magnetic material; means for generating a rotating magnetic field; and means for detecting the interaction between the tag and the rotating magnetic field.

While the invention has relatively wide applicability in surgical procedures, it will be described hereafter in relation to one embodiment, namely the location of catheters.

The use of catheters for drug delivery and other medical/surgical procedures is increasing. Typically, catheters are inserted via a major blood vessel in the leg or arm of the patient. This is conventionally done by inserting a guide wire into the selected blood vessel, and passing the catheter over the wire in the manner of a sheath. Once the catheter is inserted, the surgeon has to ensure that it reaches the desired site of action. This is conventionally achieved by attaching a coil set to the wire over which the catheter is carried, and then sensing the location of the coil. This requires an electrical connection between the coil set within the patient's body and the exterior.

The current generation of catheter location systems use a hand-held receiver unit, connected to an active marker on the catheter by a cable. The receiver is swept over the area of the body where the end of catheter is expected to be, and an audible indication of proximity is given, together with a visual indication of the direction that the catheter is pointing in. As the receiver passes over the plane of the tag, an audible beep is heard.

Furthermore, once the catheter is correctly positioned, with its tip at the desired site of action, the locating wire (with the coil set which it carries) is withdrawn from the patient, leaving the catheter in place. After withdrawal of the coil set, it is virtually impossible to determine the location of the catheter tip; the surgeon has to assume that there has been no movement of the catheter during or after withdrawal of the wire. This assumption, at best, is unreliable and may, in critical applications, be dangerous.

According to a fourth aspect of the present invention, there is provided a catheter which is characterised in that it carries, at or close to its tip, a tag formed of a high permeability magnetic material. The tag can be very small and does not interfere with the catheter's operation.

According to a fifth aspect of the present invention, there is provided a catheter location system which comprises a catheter which carries, at or close to its tip, a tag formed of a high permeability magnetic material; means for generating a rotating magnetic field; and means for detecting the interaction between the tag and the rotating magnetic field.

In the present invention, the tag is made from a high permeability magnetic material (such as those described elsewhere for making tags for Flying Null systems). No electrical connection is required, which is a major advantage, as the ability to sterilise the catheter is not affected by the presence of the tag. All the other functionality of the existing catheter location systems can be implemented.

In the description which follows, the invention will be described in relation to one specific embodiment. The system uses proprietary Flying Null technology, based on the existing Flying Null Reader electronics, to determine the position and orientation of the tag. The accompanying drawings are, briefly, as follows.

Figure 1:
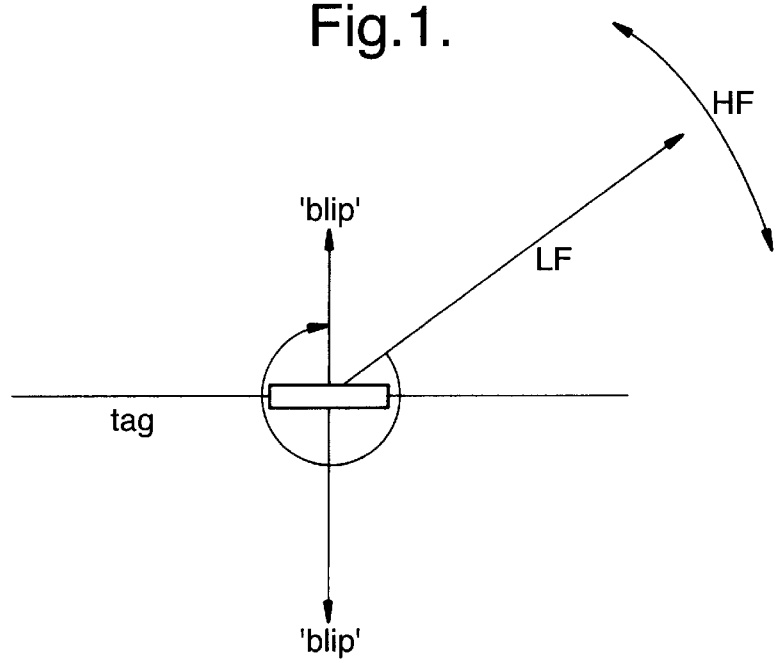
FIG. 1 illustrates the basis of operation of the catheter location system.
Figure 2:
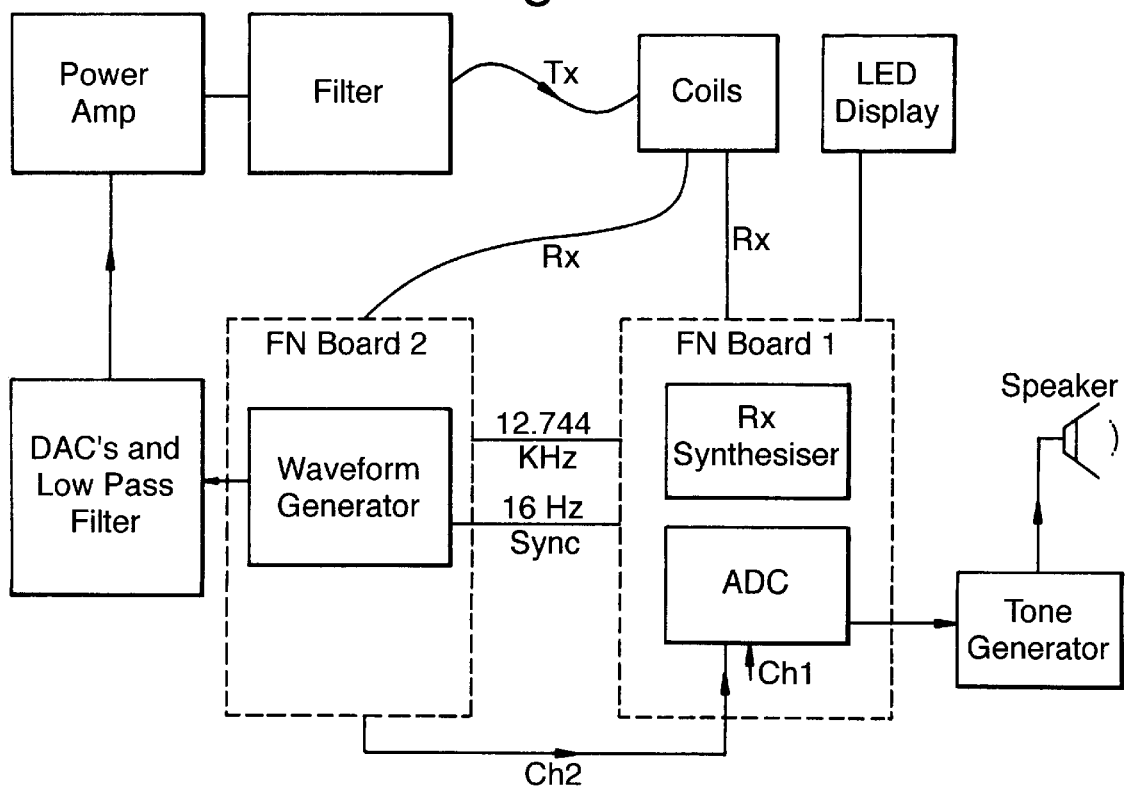
FIG. 2 is a block diagram of the components of the system.

The operation of this system is best understood by first considering a much simpler system with a set of coils similar to those in the Flying Null loop reader antenna (patent applications GB9612831.9; GB9621001.8), but with a DC bias field in the plane of the coil. If a tag is placed in the centre of the loop and rotated, the received signal in the single receiver coil will be a series of "blips", corresponding to the points when the tag is orthogonal to the bias field. This is illustrated in FIG. 1.

In the frame of reference of the tag, the loop antenna (with its 6.37 kHz transmit field) and the DC bias field appear to be rotating. If the rotational position of the bias field is known as a function of time, then measurement of the time at which the blip occurs can be used to calculate the direction of the tag. This is the basis of operation of the catheter location system. Rather than spinning the coil and bias magnet, the rotation bias and HF drive fields are preferably generated by two orthogonal sets of coils. The waveforms to these coils consist of a sinusoidal low frequency (LF) component onto which is superimposed an HF component whose envelope is equal to the LF signal, shifted in phase by 90 degrees.

The spinning receiver coil is again preferably synthesised from a pair of orthogonal coils, whose outputs are combined with sine and cosine weights to generate a single receive channel output.

The prototype system was constructed using two circuit boards of the type used in Flying Null applications: Board 1 is configured as a 2-channel reader, whilst board 2 is used as the basis for a waveform generator. For convenience, these will be referred to as FN boards.

The transmit coils in this example are a pair of simple, orthogonal solenoids wound on a rectangular former, with 120 turns of 0.6 mm copper wire. The windings are distributed with a bias towards the edges of the former.

Figure 3:
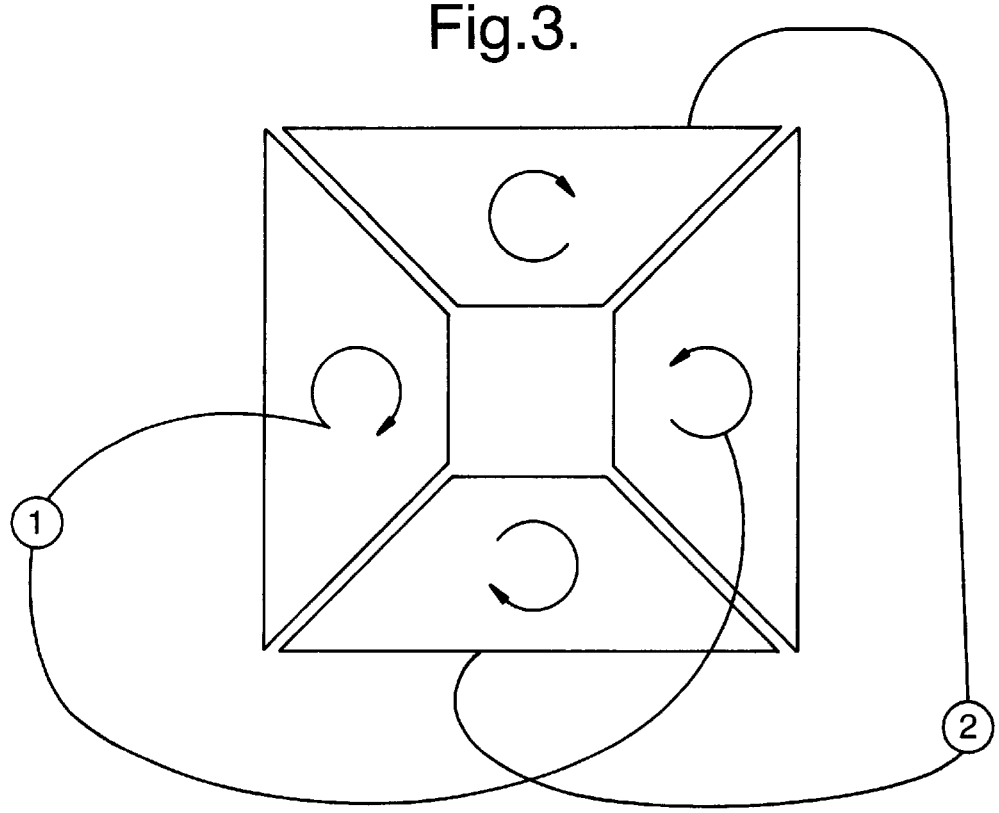
FIG. 3 illustrates an advantageous configuration for the receive coil in the detection apparatus.

The receive coils each consist of two trapezoidal coils, wound in opposite directions, such that the combined inductance is equal to 3 mH (about 150 turns of wire). (See FIG. 3).

Other coil arrangements are also possible, in particular with the receivers wound as two stacked solenoids, each half the thickness of the transmit coil.

The waveform generator is driven by one of the two 80552 microcontrollers. It has two 16-bit DACs which are updated at about 25 kHz. The waveforms are first generated and stored in an array. The contents of the array are then clocked out to the DAC's to generate the waveforms. The DAC's are double-buffered, so that the data can be entered asynchronously, but the new values can be latched simultaneously and synchronously for both channels using a hardware clock. Two RC filters are used on each output to remove the higher harmonics. Each time the array cycles round, a short pulsed is generated which is used to synchronise the waveform generator with the second FN board (see below).

The waveforms are generated using equations of the form:

$$x_n = LF \cdot \sin\{2\pi n / N + p\} + $$
$$HF \cdot \cos\{2\pi n / N\} \cdot \sin\{2\pi n / 4 + ph1\}$$
$$y_n = LF \cdot \cos\{2\pi n / N + p\} - $$
$$HF \cdot \sin\{2\pi n / N\} \cdot \sin\{2\pi n / 4 + ph2\}$$

A 160 w MOSFET stereo power amplifier was chosen to drive the coils. This was the simplest method to integrate suitable power amplifiers and their power supply into a single box. The filter consists of a high-Q parallel resonant circuit (resonant at 12.744 Khz, i.e. at the second harmonic frequency) in series with the transmit coil. The transmit coil also forms part of a parallel resonant circuit at 6.37 kHz.

The two FN boards are connected to the two sets of receiver coils. The boards are synchronised together by coupling the 12.744 kHz detection signal from the waveform generator board to the second board.

The second FN board forms the basis of the receive coil synthesizer. Both receivers are sampled at a rate of 3.186 kHz. The least significant 2 bits of the 10 bit result can be discarded because to reduce processing time.

Initially, the system samples background values, and stores these in an array. This array is indexed by the sample number since the last synchronisation pulse. A total of 192 samples are expected between each sync pulse from the waveform generator.

Once a set of background values has been acquired, the system enters normal operation. In this mode, the indexed background value is initially subtracted from the incoming receiver values. After limiting the values to prevent later maths overflow, each channel is then multiplied by either cos (channel 1 (R)) or sin (channel 2(L)) of the rotation angle, and the results are added together to generate the final synthesized receive signal. This is output in real time via a PWM for display on an oscilloscope.

A peak and zero-crossing detection algorithm adapted from the original FN tag decoding system is used to determine where peaks occur. The polarity of the recovered signals is always the same (i.e. the negative peak is always first). Rather than determining the time at which the midpoint between the peak and the trough occurs (as in the FN tag reader), the system picks the point at which the signal crosses through zero from the negative direction.

Figure 4:
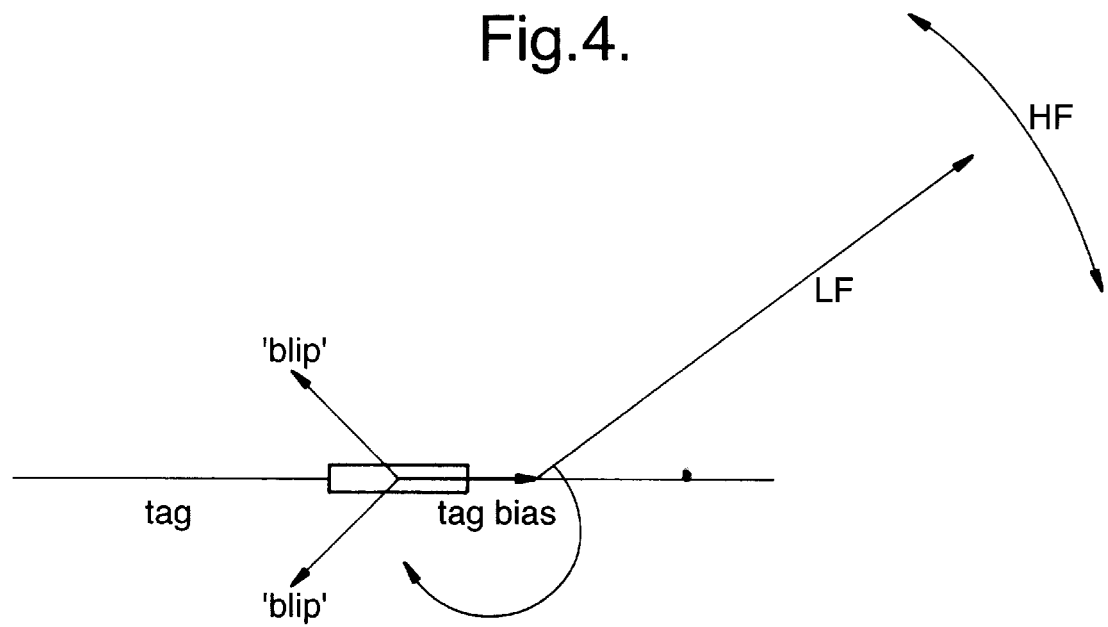
FIG. 4 illustrates the operation of an orientation-determining technique.

For each complete cycle (i.e. one revolution of the LF field), two zero crossings should be detected. In the absence of any external fields, these should be exactly equally spaced in time (as illustrated in FIG. 1). When a DC field is present along the tag, the times at which the net gradient along the tag is zero are no longer equally spaced, and an asymmetry occurs in the timing of the zero crossings (see FIG. 4). This asymmetry is used to resolve the 180 degree ambiguity over the direction of the tag. The direction is calculated from the time which is exactly in the centre of the shorter of the two gaps. This information is converted and fed to a set of 8 LED's to indicate the angle.

An audible indication of the proximity of the tag is generated by feeding information on the amplitude of the signal via a PWM output to a voltage-to-frequency converter, which drives a small speaker. A similar arrangement may be used to drive the AGC proposed in the modification mentioned below.

The amplitude information is differentiated to determine the point of closest approach to the tag. When this is detected, an audible beep is generated.

The dynamic range, and hence the range over which the tag reader will operate, can be extended by implementing a simple AGC. The receiver board generates a signal (the AGC voltage) which sets the overall amplitude of the waveform generator. Initially, this is set at its maximum value, but if the input to the receiver begins to overload, the AGC voltage is reduced in steps until the receiver signal is the correct amplitude. As the background level depends on the waveform generator drive level, the system captures background signals for a number of different drive levels before tag detection begins.

With large bias fields on the tag, the familiar symmetric tag signal becomes distorted into a simple peak. The detection algorithm can be modified to accept this signal instead, following the use of larger bias fields and reducing any possibility of the ambiguity of tag direction.

The two FN boards use a serial interface. All that is needed for control is a PC running terminal emulator at 9600 baud, 8 bits, 1 stop bit, no parity, no flow control. Connection is made using a standard 9-way cable. No interaction with the waveform generator is required in normal operation. Therefore only the main receive decoder board (the upper board) needs to be connected to the PC. This board stores its settings in non-volatile RAM, so once it is set up, no changes are needed.

Slowly scan the coil set over the tag, keeping the distance from the tag less than 9.5 cm. When the tag is near enough, the warble tone will be heard, and the LED closest to the correct direction should illuminate. As the coil passes its closest direction, the decoder may beep, if a sufficiently strong signal is detected. As the coil set is moved away, one LED will remain illuminated for 1 second. This will be the LED which was illuminated when the signal was strongest.

The warble tone indicates proximity to the tag. To demonstrate this, move the coils up and down over the tag. The pitch of the tone will increase and decrease.

The LED's indicate direction. To illustrate this, hold the coils over the tag at a fixed distance and rotate them around. The LED display should track the tag direction, unambiguously, over a full 360 degrees.

If the system starts to beep/warble when no tag is present, it may be reset by pressing return on the terminal emulator—several times if necessary.

The transmit coils in the embodiment just described were as follows:

| | |
|---|---|
| Size | 132 mm × 132 mm × 53 mm high |
| Turns | 120 turns of 0.6 mm wire |
| Inductance | 863 μH |
| Resistance | 3.45 Ω |
| Q @ 6.37 kHz | 10 |
| LF current | 3.1 A peak (cold) |
| | 3.0 A peak (warm) |
| HF current | 3.5A peak-peak (warm) |
| LF dipole moment | 2.52 $Am^2$ |
| HF dipole moment | 1.47 $Am^2$ |
| Power dissipation | 31.5 w (LF) |
| | 7.6 W (HF) |
| | 39 W total for whole antenna | and the receive coils had the following characteristics:

| | |
|---|---|
| Inductance | 3.15 mH |
| Q | 9.4 @ 10 kHz |
| Quadrupole moment | 0.048 $Am^3$ |

The performance of the system is as follows:

| | |
|---|---|
| Detection range: | 95 mm for 25 mm long tag |
| Angular resolution: | 2 degrees |
| Angular accuracy: | +/−45 degrees or better |

While the invention has been described with specific reference to certain embodiments thereof, it will be apparent to those of ordinary skill in the art that it may be used in a variety of circumstances other than those described herein. Such additional uses form part of this invention, as defined in the appended claims.

Figure 5:
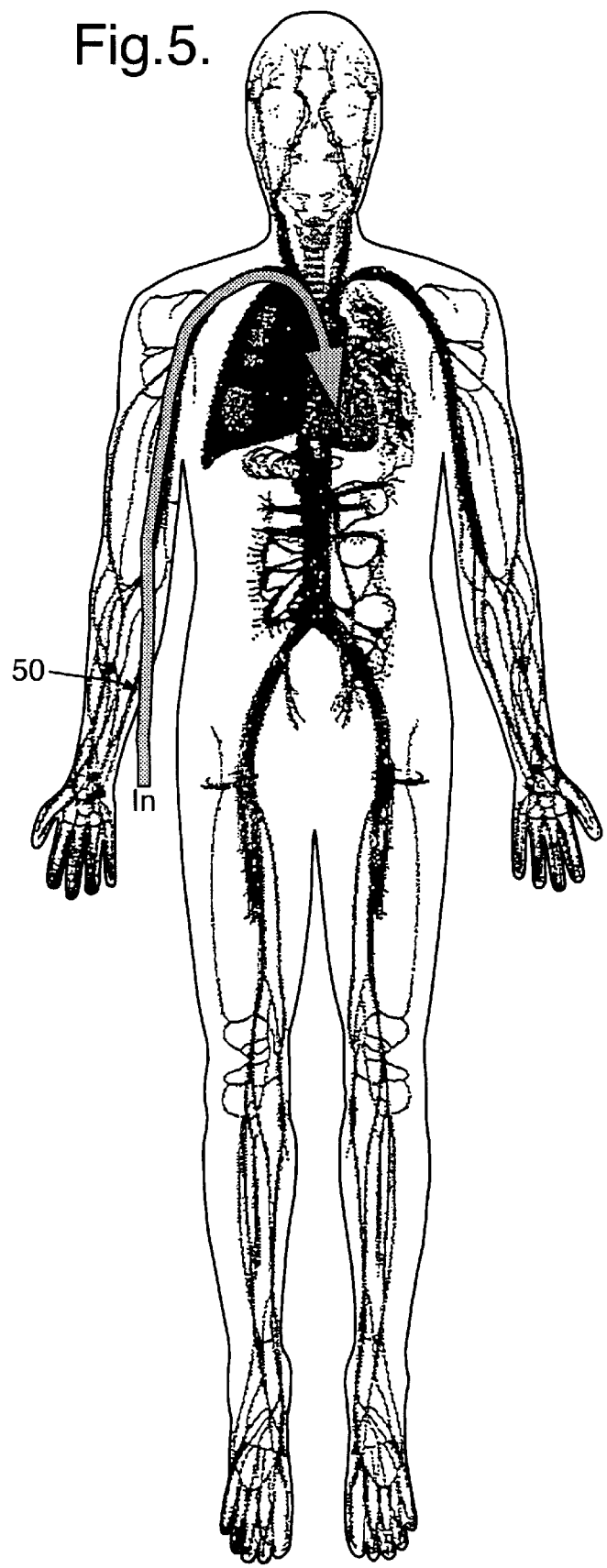
FIG. 5 illustrates the placement of a catheter in the body of a human patient.

Referring to FIG. 5, a catheter in accordance with this invention may be inserted into a vein as at 50 and then be guided to the site where drug delivery is required - in this illustration, to the heart. The system described above may be used to determine progress of the catheter towards the heart, giving information about its direction at any given time as required, and also enabling the final positioning of the catheter tip to be achieved with great accuracy.

What is claimed is:

1. A method of determining the position and orientation of a surgical device within the human or animal body, which comprises the steps of:

A. inserting the surgical device into the body together with a magnetically active marker, the marker comprising (1) a high permeability, low coercivity magnetic material and (2) a magnetised bias element, and having a fixed positional relationship with respect to said surgical device;

B. generating a rotating magnetic field in the vicinity of the surgical device, said rotating magnetic field comprising a high frequency AC field component and a DC bias field component; and C. sensing the position of the marker, and hence of the surgical device, by remotely detecting the magnetic response to said rotating magnetic field.

2. A method according to claim 1, further comprising the step of providing said surgical device in the form of a catheter.

3. A method according to claim 2, further comprising the step of locating said marker close to the tip of the catheter.

4. A method according to claim 3, further comprising the step of forming said marker as a thin film, a wire or a strip.

5. A method according to claim 4, further comprising the step of forming said marker as a thin film, a wire or a strip.

6. A method according to claim 2, further comprising the step of providing the marker on a guide wire used during insertion of the catheter.

7. A method according to claim 6, further comprising the step of forming said marker as a thin film, a wire or a strip.

8. A method according to claim 2, further comprising the step of forming said marker as a thin film, a wire or a strip.

9. A method according to claim 1, further comprising the step of providing said marker in the form of a thin film, a wire or a strip.

10. A method according to claim 1, further comprising the step of providing said surgical device in the form of a prosthesis.

11. A method as claimed in claim 1, further comprising the step of synthesizing said rotating magnetic field using a pair of orthogonally positioned transmit coil, which are driven with a low frequency component current onto which is superimposed a high frequency component, the envelope of said high frequency component being equal to said low frequency component but shifted in phase by 90 degrees.

12. A system for use in determining the position and orientation of a surgical device within the human or animal body, which system comprises:

(i) a surgical device which carries, at a predetermined location, a tag formed of (1) a high permeability, low coercivity magnetic material and (2) a magnetised bias element;

(ii) means for generating a rotating magnetic field; and (iii) means for detecting the interaction between the tag and the rotating magnetic field.

13. A system as claimed in claim 12, wherein the system comprises a pair of orthogonally arranged solenoids which function as transmit coils, the waveforms fed to the solenoids (x and y) being arranged to synthesise a rotating magnetic field.

14. A system as claimed in claim 13, wherein said transmit coils are supplied with waveforms comprising a sinusoidal low frequency signal component onto which is superimposed a high frequency signal component whose envelope is equal to the low frequency signal but shifted in phase by 90 degrees.

15. A system as claimed in claim 13, which comprises a receiver arrangement in the form of a pair of orthogonal coils whose outputs are combined with sine and cosine weightings to generate a single receive output.

* * * * *